United States Patent
Zhang et al.

(10) Patent No.: US 9,678,842 B2
(45) Date of Patent: Jun. 13, 2017

(54) PCIE SWITCH-BASED SERVER SYSTEM, SWITCHING METHOD AND DEVICE

(71) Applicant: HUAWEI TECHNOLOGIES CO., LTD., Shenzhen, Guangdong (CN)

(72) Inventors: Xiong Zhang, Shenzhen (CN); Fei Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 14/453,072

(22) Filed: Aug. 6, 2014

(65) Prior Publication Data
US 2014/0351654 A1    Nov. 27, 2014

Related U.S. Application Data (63) Continuation of application No. PCT/CN2012/083614, filed on Oct. 26, 2012.

(51) Int. Cl.
*G06F 11/00* (2006.01)
*G06F 11/22* (2006.01)
(Continued)

(52) U.S. Cl.
CPC ...... *G06F 11/2221* (2013.01); *H04L 41/0663* (2013.01); *H04L 41/0672* (2013.01);
(Continued)

(58) Field of Classification Search
CPC ............ G06F 11/2007; G06F 11/2005; H04L 41/0663
See application file for complete search history.

(56) References Cited

U.S. PATENT DOCUMENTS 7,461,141 B2 * 12/2008 Byers ................... G06F 9/4411
                                                    709/220
9,342,422 B2 *  5/2016 Arroyo ............... G06F 11/2097
(Continued)

FOREIGN PATENT DOCUMENTS

CN        1753376 A      3/2006
CN        1909559 A      2/2007
(Continued)

*Primary Examiner* — Bryce Bonzo
*Assistant Examiner* — Jonathan Gibson
(74) *Attorney, Agent, or Firm* — Leydig, Voit & Mayer, Ltd.

(57) ABSTRACT

A PCIE switch-based server system, switching method and device are disclosed. The system includes: an active PCIE switch device, where the active PCIE switch device includes a communication interface and a first PCIE switch module, and the first PCIE switch module includes at least two first PCIE ports; a standby PCIE switch device, where the standby PCIE switch device includes a communication interface and a first PCIE switch module, and the first PCIE switch module includes at least two first PCIE ports; where the communication interface of the active PCIE switch device and the communication interface of the standby PCIE switch device are interconnected, so that the standby PCIE switch device obtains switch network configuration information of the active PCIE switch device through the communication interface of the active PCIE switch device and the communication interface of the standby PCIE switch device.

8 Claims, 5 Drawing Sheets

(51) Int. Cl.
  *H04L 12/24* (2006.01)
  *H04L 12/931* (2013.01)
  *H04L 12/939* (2013.01)

(52) U.S. Cl.
  CPC .......... *H04L 41/0846* (2013.01); *H04L 49/35* (2013.01); *H04L 49/552* (2013.01); *H04L 49/557* (2013.01)

(56) References Cited

U.S. PATENT DOCUMENTS

| | | |
|---|---|---|
| 2006/0004837 A1 | 1/2006 | Genovker et al. |
| 2006/0059389 A1 | 3/2006 | Hatamori |
| 2006/0236017 A1 | 10/2006 | Rooholamini et al. |
| 2007/0239925 A1 | 10/2007 | Koishi |
| 2008/0239945 A1* | 10/2008 | Gregg ................ G06F 11/2005 370/217 |
| 2008/0240134 A1 | 10/2008 | Gregg |
| 2008/0267090 A1* | 10/2008 | Okita .................... H04L 12/66 370/254 |
| 2009/0063894 A1* | 3/2009 | Billau ................. G06F 11/2005 714/5.11 |
| 2009/0070775 A1 | 3/2009 | Riley |
| 2010/0146327 A1 | 6/2010 | Takubo |
| 2010/0161838 A1* | 6/2010 | Daniel ................. G06F 13/385 710/8 |
| 2010/0214950 A1* | 8/2010 | Vobbilisetty ............ H04L 45/02 370/254 |
| 2011/0131361 A1 | 6/2011 | Itakura |
| 2013/0111075 A1 | 5/2013 | Sato |

FOREIGN PATENT DOCUMENTS

| | | |
|---|---|---|
| CN | 101102177 A | 1/2008 |
| CN | 101197649 A | 6/2008 |
| CN | 101242371 A | 8/2008 |
| CN | 101247235 A | 8/2008 |
| JP | 2006072492 A | 3/2006 |
| JP | 2010134757 A | 6/2010 |
| JP | 2011081462 A | 4/2011 |
| JP | 2013097553 A | 5/2013 |
| KR | 20040039102 A | 5/2004 |
| KR | 20050006783 A | 1/2005 |

\* cited by examiner

601 — Before active and standby PCIE switch devices execute active-standby switching, the standby PCIE switch device obtains switch network configuration information of the active PCIE switch device through a communication interface of the standby PCIE switch device and adopts the obtained switch network configuration information to perform configuration same as that of the active PCIE switch device; and a PCIE endpoint synchronizes port configuration information of a second PCIE port connected to the active PCIE switch device to a second PCIE port connected to the standby PCIE switch device 602 — After the active and standby PCIE switch devices execute the active-standby switching, the PCIE endpoint obtains active-standby states of the active and standby PCIE switch devices, and adds a second PCIE port connected to a processing module of the PCIE endpoint to a PCIE switch partition where the second PCIE port connected to the active PCIE switch device after the switching is located

PCIE SWITCH-BASED SERVER SYSTEM, SWITCHING METHOD AND DEVICE

CROSS-REFERENCE TO RELATED APPLICATIONS

This application is a continuation of International Application No. PCT/CN2012/083614, filed on Oct. 26, 2012, which is hereby incorporated by reference in its entirety.

TECHNICAL FIELD

The present disclosure relates to the field of communications technologies, and in particular, to a PCIE (peripheral component interconnect express) switch-based server system, switching method and device.

BACKGROUND

A blade server refers to multiple cassette server units (generally referred to as "blades") instrumented in a rack type chassis with standard height, and is a low-cost server platform for implementing high availability and high density. Each "blade" actually is a system motherboard.

An existing blade server is disposed with two types of blades, one is a server blade, and the other is a hardware accelerator blade. The hardware accelerator blade gathers multiple hardware accelerator devices together, such as a GPU (graphic processing unit), an SSD (solid state disk), and a DSP (digital signal processor). The server blade and the hardware accelerator blade are interconnected through a PCIE switch fabric unit, the server blade may share the hardware accelerator blade through the PCIE switch fabric unit, and each hardware accelerator blade may be allocated to the server blade according to an actual requirement, which is quite flexible in use.

In a process of implementing the present disclosure, the inventor finds that the prior art has at least the following problems:

The hardware accelerator blade is connected to the server blade through one PCIE switch fabric unit, so if the PCIE switch fabric unit fails, it is caused that an entire system cannot be accessed, thereby causing low reliability of the system.

SUMMARY

In order to solve problems in the prior art, embodiments of the present disclosure provide a PCIE switch-based server system, switching method and device. The technical solutions are as follows:

In one aspect, an embodiment of the present disclosure provides a PCIE switch-based server system, and the system includes:

an active PCIE switch device, where the active PCIE switch device includes a communication interface and a first PCIE switch module, and the first PCIE switch module includes at least two first PCIE ports; and a standby PCIE switch device, where the standby PCIE switch device includes a communication interface and a first PCIE switch module, and the first PCIE switch module includes at least two first PCIE ports; where the communication interface of the active PCIE switch device and the communication interface of the standby PCIE switch device are interconnected, so that the standby PCIE switch device obtains switch network configuration information of the active PCIE switch device through the communication interface of the active PCIE switch device and the communication interface of the standby PCIE switch device.

For example, the active PCIE switch device and the standby PCIE switch device each include a first control module, where the first control module includes a first central processing unit, and the first central processing unit of the active PCIE switch device is configured to interact with the first central processing unit of the standby PCIE switch device through the communication interface of the active PCIE switch device and the communication interface of the standby PCIE switch device, so that the standby PCIE switch device obtains the switch network configuration information of the active PCIE switch device.

Preferably, the system further includes:

a PCIE endpoint, where the PCIE endpoint includes a second PCIE switch module, the second PCIE switch module includes two second PCIE ports, one second PCIE port is connected to one first PCIE port of the at least two first PCIE ports of the active PCIE switch device, and the other second PCIE port is connected to one first PCIE port of the at least two first PCIE ports of the standby PCIE switch device.

For example, the PCIE endpoint further includes a second control module and a processing module, and the second control module includes a second central processing unit, the second central processing unit is configured to synchronize port configuration information of the second PCIE port connected to the active PCIE switch device to the second PCIE port connected to the standby PCIE switch device, and after active-standby switching of the active PCIE switch device and the standby PCIE switch device, add a downlink port connected to the processing module to a PCIE switch partition where the second PCIE port connected to the active PCIE switch device after the switching is located, where the two second PCIE ports connected to the active PCIE switch device and the standby PCIE switch device are uplink ports, and the second PCIE port connected to the processing module is the downlink port, and the two uplink ports are located in different PCIE switch partitions.

Furthermore, before the active-standby switching of the active PCIE switch device and the standby PCIE switch device, a partition where the second PCIE port connected to the active PCIE switch device is located is an active PCIE switch partition, and a partition where the second PCIE port connected to the standby PCIE switch device is located is a standby PCIE switch partition, and the second central processing unit is configured to add the downlink port connected to the processing module to the active PCIE switch partition; and after the active-standby switching of the active PCIE switch device and the standby PCIE switch device, a partition where the second PCIE port connected to the active PCIE switch device after the switching is located is an active PCIE switch partition after the switching, a partition where the second PCIE port connected to the standby PCIE switch device after the switching is located is a standby PCIE switch partition after the switching, and the second central processing unit is configured to add the downlink port connected to the processing module to the active PCIE switch partition after the switching.

Preferably, the system further includes:

a host, where the host includes two third PCIE ports, one third PCIE port is connected to the other first PCIE port of the at least two first PCIE ports of the active PCIE switch device, and the other third PCIE port is connected to the other first PCIE port of the at least two first PCIE ports of the standby PCIE switch device; and the host communicates with the PCIE endpoint through the active PCIE switch device.

For example, the host further includes a third control module, and the third control module includes a third central processing unit, where the third central processing unit is configured to, after the active-standby switching of the active PCIE switch device and the standby PCIE switch device, open the third PCIE port connected to the active PCIE switch device after the switching, adopt port configuration information of the third PCIE port connected to the active PCIE switch device before the switching to configure the third PCIE port connected to the active PCIE switch device after the switching, and at the same time, disable the third PCIE port connected to the standby PCIE switch device after the switching.

Preferably, the active PCIE switch device and the standby PCIE switch device each further include a fault detection module, where the fault detection module of the active PCIE switch device is configured to detect whether a fault exists in a PCIE link connected to the active PCIE switch device and whether the active PCIE switch device fails; and the fault detection module of the standby PCIE switch device is configured to detect whether a fault exists in a PCIE link connected to the standby PCIE switch device and whether the standby PCIE switch device fails.

Preferably, the active PCIE switch device further includes an active-standby interlocking module, configured to execute the active-standby switching of the active PCIE switch device according to a control instruction of the first control module of the active PCIE switch device, and send an active-standby state of the PCIE switch device after the switching to the first control module of the PCIE switch device and the PCIE endpoint; and when the device is the standby PCIE switch device, the active-standby interlocking module is configured to obtain an active-standby state of the active PCIE switch device by interacting with an active-standby interlocking module of the active PCIE switch device, execute active-standby switching according to the obtained active-standby state of the active PCIE switch device, and send the active-standby state of the PCIE switch device after the switching to the first control module of the PCIE switch device and the PCIE endpoint.

For example, the communication interface of the active PCIE switch device and the communication interface of the standby PCIE switch device are fast Ethernet interfaces or gigabit Ethernet interfaces.

In another aspect, an embodiment of the present disclosure provides a peripheral component interconnect express PCIE switch device, and the device includes:

a first PCIE switch module and a communication interface configured to connect to another PCIE switch device, where the first PCIE switch module includes at least two first PCIE ports;

when the device is used as an active PCIE switch device and the another PCIE switch device is used as a standby PCIE switch device, the device transfers switch network configuration information of the active PCIE switch device to the another PCIE switch device through the communication interface; and when the device is used as a standby PCIE switch device and the another PCIE switch device is used as an active PCIE switch device, the device obtains switch network configuration information of the active PCIE switch device through the communication interface.

For example, the device further includes a first control module, and the first control module includes:

a first central processing unit, configured to interact with a first central processing unit of the another PCIE switch device through the communication interface, so that the standby PCIE switch device obtains the switch network configuration information of the active PCIE switch device.

Preferably, the device further includes:

a fault detection module, configured to detect whether a fault exists in a PCIE link connected to the first PCIE port and whether a fault exists in the PCIE switch device, where the fault detection module is connected to the first control module.

Preferably, the device further includes an active-standby interlocking module:

when the device is the active PCIE switch device, the active-standby interlocking module is configured to execute active-standby switching according to a control instruction of the first control module, and send an active-standby state of the PCIE switch device after the switching to the first control module, a host or a PCIE endpoint; and when the device is the standby PCIE switch device, the active-standby interlocking module is configured to obtain an active-standby state of the active PCIE switch device by interacting with an active-standby interlocking module of the active PCIE switch device, execute active-standby switching according to the obtained active-standby state of the active PCIE switch device, and send the active-standby state of the PCIE switch device after the switching to the first control module of the PCIE switch device, a host or a PCIE endpoint.

In another aspect, an embodiment of the present disclosure further provides a peripheral component interconnect express PCIE endpoint, and the PCIE endpoint includes a second PCIE switch module and the second PCIE switch module includes two second PCIE ports, where one second PCIE port is configured to connect to a first PCIE port of an active PCIE switch device, and the other second PCIE port is configured to connect to a first PCIE port of a standby PCIE switch device.

For example, the PCIE endpoint further includes a second control module and a processing module, and the second control module includes a second central processing unit, the second central processing unit is configured to synchronize port configuration information of the second PCIE port connected to the active PCIE switch device to the second PCIE port connected to the standby PCIE switch device, and after active-standby switching of the active PCIE switch device and the standby PCIE switch device, add a second PCIE port connected to the processing module to a PCIE switch partition where the second PCIE port connected to the active PCIE switch device after the switching is located, where the two second PCIE ports connected to the active PCIE switch device and the standby PCIE switch device are uplink ports, and the second PCIE port connected to the processing module is a downlink port, and the two uplink ports are located in different PCIE switch partitions.

In another aspect, an embodiment of the present disclosure further provides a host, and the host includes two third PCIE ports, where one third PCIE port is configured to connect to a first PCIE port of an active PCIE switch device and the other third PCIE port is configured to connect to a first PCIE port of a standby PCIE switch device.

For example, the host further includes a third control module, and the third control module includes a third central processing unit, where the third central processing unit is configured to, after active-standby switching of the active PCIE switch device and the standby PCIE switch device, open the third PCIE port connected to the active PCIE switch device after the switching, adopt port configuration information of the third PCIE port connected to the active PCIE switch device before the switching to configure the third PCIE port connected to the active PCIE switch device after the switching, and at the same time, disable the third PCIE port connected to the standby PCIE switch device after the switching.

In another aspect, an embodiment of the present disclosure further provides a PCIE switch-based switching method, and the method includes:

transferring, by an active PCIE switch device, switch network configuration information of the active PCIE switch device to a standby PCIE switch device through a communication interface of the active PCIE switch device, so that the standby PCIE switch device adopts the switch network configuration information to configure the standby PCIE switch device.

Preferably, the method further includes:

synchronizing, by a PCIE endpoint, port configuration information of a second PCIE port connected to the active PCIE switch device to a second PCIE port connected to the standby PCIE switch device before active-standby switching of the active PCIE switch device and the standby PCIE switch device; and after the active-standby switching of the active PCIE switch device and the standby PCIE switch device, adding, by the PCIE endpoint, a second PCIE port connected to a processing module of the PCIE endpoint to a PCIE switch partition where the second PCIE port connected to the active PCIE switch device after the switching is located, where the second PCIE port connected to the active PCIE switch device and the second PCIE port connected to the standby PCIE switch device are located in different PCIE switch partitions.

For example, the method further includes:

opening, by a host, a third PCIE port connected to the active PCIE switch device after the switching after the active-standby switching of the active PCIE switch device and the standby PCIE switch device, adopting port configuration information of a third PCIE port connected to the active PCIE switch device before the switching to configure the third PCIE port connected to the active PCIE switch device after the switching, and at the same time, disabling the third PCIE port connected to the standby PCIE switch device after the switching, where the host includes two third PCIE ports, one third PCIE port is connected to a first PCIE port of the active PCIE switch device and the other third PCIE port is connected to a first PCIE port of the standby PCIE switch device.

Furthermore, the method further includes:

detecting, by a fault detection module of the active PCIE switch device, whether a fault exists in a PCIE link connected to the active PCIE switch device, and whether a fault exists in the active PCIE switch device; and if a fault exists in the PCIE link or a fault exists in the active PCIE switch device, executing the active-standby switching on the active PCIE switch device and the standby PCIE switch device.

Furthermore, the method further includes:

executing, by an active-standby interlocking module of the active PCIE switch device, the active-standby switching according to a control instruction of a first control module of the active PCIE switch device, and sending an active-standby state of the PCIE switch device after the switching to the first control module of the device, the host or the PCIE endpoint, and an active-standby interlocking module of the standby PCIE switch device.

Furthermore, the method further includes:

obtaining, by the active-standby interlocking module of the standby PCIE switch device, the active-standby state of the active PCIE switch device by interacting with the active-standby interlocking module of the active PCIE switch device, executing the active-standby switching of the standby PCIE switch device according to the obtained active-standby state of the active PCIE switch device, and sending the active-standby state of the PCIE switch device after the switching to the first control module of the standby PCIE switch device, the host and the PCIE endpoint.

In the embodiments of the present disclosure, an active PCIE switch device and a standby PCIE switch device are disposed, and interconnected communication interfaces are disposed on the two PCIE switch devices, so that switch network configuration information of the active PCIE switch device may be transferred to the standby PCIE switch device through the communication interfaces. When a fault occurs in the active PCIE switch device, the standby PCIE switch device may adopt switch network configuration information same as that of the active PCIE switch device to perform configuration, thereby improving reliability of a system.

BRIEF DESCRIPTION OF DRAWINGS

To describe the technical solutions in the embodiments of the present disclosure more clearly, the following briefly introduces accompanying drawings required for describing the embodiments.

DESCRIPTION OF EMBODIMENTS

To make the objectives, technical solutions, and advantages of the present disclosure more comprehensible, the following further describes implementation manners of the present disclosure in detail with reference to the accompanying drawings.

Embodiment 1

Figure 1:
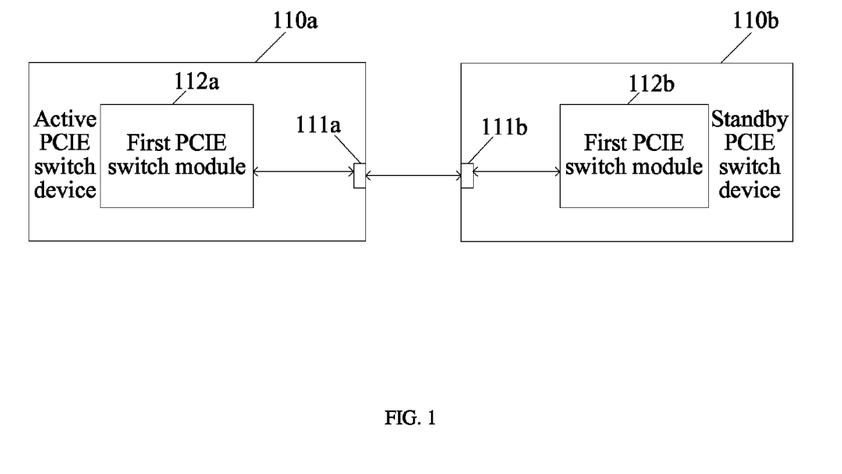
FIG. 1 is a schematic structural diagram of a PCIE switch-based server system according to Embodiment 1 of the present disclosure.

An embodiment of the present disclosure provides a PCIE (peripheral component interconnect express) switch-based server system. Referring to FIG. 1, the system includes: an active PCIE switch device 110*a* and a standby PCIE switch device 110*b*.

For example, the active PCIE switch device 110a includes a communication interface 111a and a first PCIE switch module 112a, and the first PCIE switch module 112a includes at least two first PCIE ports (not shown in the figure). The standby PCIE switch device 110b includes a communication interface 111b and a first PCIE switch module 112b, and the first PCIE switch module 112b includes at least two first PCIE ports (not shown in the figure). The communication interface 111a of the active PCIE switch device 110a and the communication interface 111b of the standby PCIE switch device 110b are interconnected, so that the standby PCIE switch device 110b obtains switch network configuration information of the active PCIE switch device 110a through the communication interface 111a of the active PCIE switch device 110a and the communication interface 111b of the standby PCIE switch device 110b.

A first PCIE port of the active PCIE switch device 110a is configured to connect to a HOST or a PCIE Endpoint, and a first PCIE port of the standby PCIE switch device 110b is also configured to connect to the HOST or the PCIE Endpoint.

For example, the communication interfaces 111a and 111b include, but are not limited, to FE (fast Ethernet) interface or GE (gigabit Ethernet) interface.

For example, in one kind of specific implementation, the PCIE switch devices 110a and 110b may be PCIE switch fabric units. In another kind of specific implementation, the PCIE switch devices 110a and 110b may be PCIE switches.

It should be noted that, in this embodiment and the following embodiments, an active PCIE switch device refers to a PCIE switch device that provides a switch service temporarily, and a standby PCIE switch device refers to a PCIE switch device that does not provide a switch service temporarily. Definitely, the active PCIE switch device and the standby PCIE switch device may also provide switch services at the same time, and a load is shared between the active and standby PCIE switch devices. Preferably, from the perspective of a hardware structure, the active PCIE switch device and the standby PCIE switch device are the same device, and whether a certain PCIE switch device is an active PCIE switch device or a standby PCIE switch device is distinguished only according to a working state.

In the embodiment of the present disclosure, an active PCIE switch device and a standby PCIE switch device are disposed, and interconnected communication interfaces are disposed on the two PCIE switch devices, so that switch network configuration information of the active PCIE switch device may be transferred to the standby PCIE switch device through the communication interfaces. When a fault occurs in the active PCIE switch device, the standby PCIE switch device may adopt switch network configuration information same as that of the active PCIE switch device to perform configuration, thereby improving reliability of a system.

Embodiment 2

Figure 2:
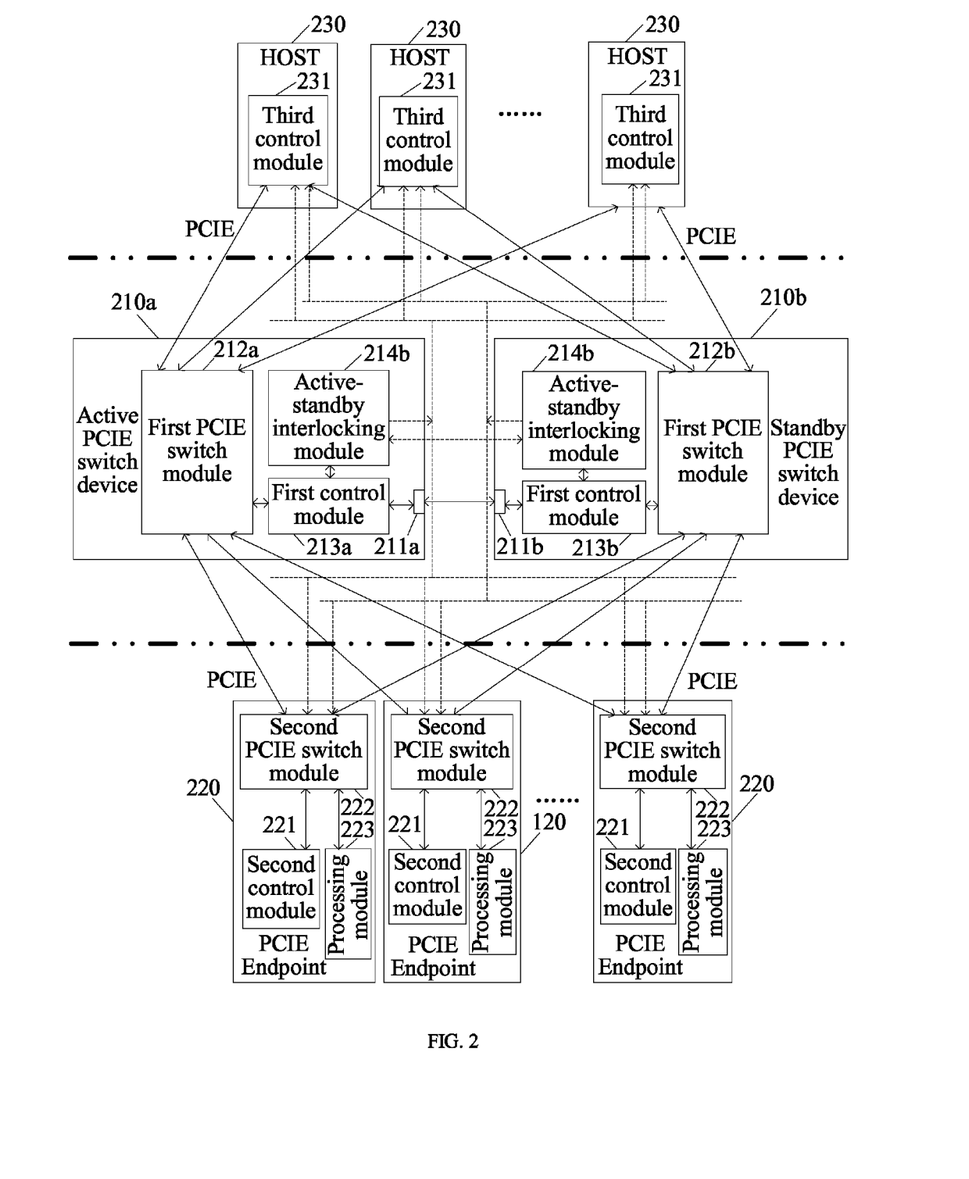
FIG. 2 is a schematic structural diagram of a PCIE switch-based server system according to Embodiment 2 of the present disclosure.

An embodiment of the present disclosure provides a PCIE switch-based server system. Referring to FIG. 2, the system includes: an active PCIE switch device 210a, a standby PCIE switch device 210b, a PCIE Endpoint 220 and a HOST 230, where the HOST 230 communicates with the PCIE Endpoint 220 temporarily through the active PCIE switch device 210a. The number of PCIE Endpoints 220 and the number of HOSTs 230 may be set as required, and are not limited here.

For example, the active PCIE switch device 210a includes a communication interface 211a and a first PCIE switch module 212a, and the first PCIE switch module 212a includes at least two first PCIE ports (not shown in the figure). The standby PCIE switch device 210b includes a communication interface 211b and a first PCIE switch module 212b, and the first PCIE switch module 212b includes at least two first PCIE ports (not shown in the figure). The communication interface 211a of the active PCIE switch device 210a and the communication interface 211b of the standby PCIE switch device 210b are interconnected.

For example, the PCIE Endpoint 220 includes a second PCIE switch module 222, and the second PCIE switch module 222 includes two second PCIE ports (not shown in the figure), where one second PCIE port is connected to one first PCIE port of the at least two first PCIE ports of the active PCIE switch device 210a, and the other second PCIE port is connected to one first PCIE port of the at least two first PCIE ports of the standby PCIE switch device 210b.

For example, the HOST 230 includes two third PCIE ports, where one third PCIE port is connected to the other first PCIE port of the at least two first PCIE ports of the active PCIE switch device 210a, and the other third PCIE port is connected to the other first PCIE port of the at least two first PCIE ports of the standby PCIE switch device 210b.

One first PCIE port of the active PCIE switch device 210a is connected to one third PCIE port of the HOST 230 through a PCIE bus, the other first PCIE port of the active PCIE switch device 210a is also connected to one second PCIE port of the PCIE Endpoint 220 through the PCIE bus; one first PCIE port of the standby PCIE switch device 210b is connected to the other third PCIE port of the HOST 230 through the PCIE bus, and the other first PCIE port of the standby PCIE switch device 210b is also connected to the other second PCIE port of the PCIE Endpoint 220 through the PCIE bus. In FIG. 2, solid lines with double-headed arrows between the HOST 230 and the PCIE switch devices 210a and 210b, and between the PCIE Endpoint 220 and the PCIE switch devices 210a and 210b indicate the PCIE bus.

Furthermore, the active PCIE switch device 210a further includes a first control module 213a, where the first control module 213a is connected to the communication interface 211a and the first PCIE switch module 212a; and the standby PCIE switch device 210b further includes a first control module 213b, where the first control module 213b is connected to the communication interface 211b and the first PCIE switch module 212b. The first control module 213a and the second control module 213b each include a first CPU (central processing unit). The first CPU of the active PCIE switch device 210a is configured to interact with the first CPU of the standby PCIE switch device 210b through the communication interface 211a of the active PCIE switch device 210a and the communication interface 211b of the standby PCIE switch device 210b, so that the first CPU of the standby PCIE switch device 210b obtains switch network configuration information of the active PCIE switch device 210a, and adopts switch network configuration information same as that of the active PCIE switch device 210a to perform configuration. For example, the switch network configuration information mainly includes configuration information of a P2P (PCI-to-PCI) bridge.

Furthermore, the PCIE Endpoint 220 further includes a second control module 221 and a processing module 223, where the second PCIE switch module 222 is connected to the second control module 221 and the processing module 223, and the processing module 223 is connected to the second PCIE switch module 222 through one second PCIE port. The second control module 221 includes: a second CPU, configured to, before switching of the active PCIE switch device 210a and the standby PCIE switch device 210b, synchronize port configuration information of the second PCIE port connected to the active PCIE switch device 210a to the second PCIE port connected to the standby PCIE switch device 210b, and after the switching of the active PCIE switch device 210a and the standby PCIE switch device 210b, add the second PCIE port connected to the processing module 223 to a PCIE switch partition where the second PCIE port connected to the active PCIE switch device after the switching 210b (the standby PCIE switch device 210b before the switching) is located, where the second PCIE port connected to the active PCIE switch device 210a and the second PCIE port connected to the standby PCIE switch device 210b are located in different PCIE switch partitions. The second PCIE ports connected to the active PCIE switch device 210a and the standby PCIE switch device 210b are uplink ports, the second PCIE port connected to the processing module 223 is a downlink port, and the two uplink ports are located in different PCIE switch partitions, that is to say, one PCIE switch partition has only one uplink port. The processing module 223 includes, but is not limited to, a GPU (Graphic Processing Unit), an SSD (Solid State Disk), a DSP (Digital Signal Processing), and an encryption/decryption unit.

The second CPU is further configured to create two PCIE switch partitions when a system is initialized, where each PCIE switch partition has only one uplink port, and the uplink ports are the second PCIE ports connected to the PCIE switch devices 210a and 210b. A partition where the second PCIE port connected to the active PCIE switch device 210a is located may be referred to as an active PCIE switch partition; and a partition where the second PCIE port connected to the standby PCIE switch device 210b is located may be referred to as a standby PCIE switch partition. In this case, the second CPU adds the downlink port connected to the processing module 223 to the active PCIE switch partition.

After active-standby switching of the active PCIE switch device 210a and the standby PCIE switch device 210b, in this case, the standby PCIE switch device 210b is used as the active PCIE switch device after the switching, and the active PCIE switch device 210a is used as the standby PCIE switch device after the switching. A partition where the second PCIE port connected to the active PCIE switch device after the switching is located is referred to as an active PCIE switch partition after the switching, and a partition where the second PCIE port connected to the standby PCIE switch device after the switching is located is referred to as a standby PCIE switch partition after the switching. In this case, the second CPU adds the downlink port connected to the processing module 223 to the active PCIE switch partition after the switching.

Furthermore, the HOST 230 includes a third control module 231, where the third control module 231 includes a third CPU, configured to, after the switching of the active PCIE switch device 210a and the standby PCIE switch device 210b, open the third PCIE port connected to the active PCIE switch device after the switching 210b, adopt port configuration information of the third PCIE port connected to the active PCIE switch device 210a before the switching to configure the third PCIE port connected to the active PCIE switch device after the switching 210b, and at the same time, disable the third PCIE port connected to the standby PCIE switch device after the switching 210a.

The third CPU is further configured to configure the entire PCIE system when the system is initialized, which includes configuring the third PCIE port of the HOST 230 itself, the PCIE switch devices 210a and 210b and the PCIE Endpoint 220.

For example, the communication interfaces 211a and 211b include, but are not limited to, FE (fast Ethernet) interface or GE (gigabit Ethernet) interface.

Preferably, the active PCIE switch device 210a further includes an active-standby interlocking module 214a, where the active-standby interlocking module 214a is connected to the first control module 213a; and the standby PCIE switch device 210b further includes an active-standby interlocking module 214b, where the active-standby interlocking module 214b is connected to the first control module 213b. As shown by dotted lines in FIG. 2, the active-standby interlocking module 214a of the active PCIE switch device 210a and the active-standby interlocking module 214b of the standby PCIE switch device 210b are interconnected. The active-standby interlocking modules 214a and 214b may be implemented by adopting a hardware circuit.

For example, the active-standby interlocking module 214a is configured to, according to a control instruction of the first control module 213a of the active PCIE switch device 210a, execute active-standby switching of the active PCIE switch device 210a and notify the standby PCIE switch device 210b of executing the active-standby switching. The active-standby interlocking module 214b of the standby PCIE switch device 210b is interacted with the active-standby interlocking module 214a of the active PCIE switch device 210a to obtain an active-standby state of the active PCIE switch device 210a, and when the active-standby state of the active PCIE switch device 210a changes, the active-standby switching of the standby PCIE switch device 210b is executed. After the active PCIE switch device 210a and the standby PCIE switch device 210b execute the active-standby switching, the active-standby interlocking modules 214a and 214b send active-standby states of the two PCIE switch devices after the switching to the HOST 230 and the PCIE Endpoint 220.

Preferably, the active PCIE switch device 210a and the standby PCIE switch device 210b each further include a fault detection module, where the fault detection module of the active PCIE switch device 210a is configured to detect whether a fault exists in a PCIE link connected to the active PCIE switch device 210a, and whether the active PCIE switch device 210a fails; and the fault detection module of the standby PCIE switch device 210b is configured to detect whether a fault exists in a PCIE link connected to the standby PCIE switch device 210b, and whether the standby PCIE switch device 210b fails. When the fault detection module of the active PCIE switch device 210a has detected that the PCIE link connected to one first PCIE port of the active PCIE switch device 210a or the active PCIE switch device 210a fails, the first control module 213a of the active PCIE switch device 210a sends a control instruction, where the control instruction is used to instruct the active-standby interlocking modules 214a and 214b to execute the active-standby switching of the two PCIE switch devices 210a and 210b.

For example, in one kind of specific implementation, the HOST 230 and the PCIE Endpoint 220 may be blades of a blade server (for example, the HOST 230 may include, but is not limited to, a server blade, and the PCIE Endpoint 220 may include, but is not limited to, a hardware accelerator blade), and the PCIE switch device 210 may be a PCIE switch fabric unit; and in another kind of specific implementation, the HOST 230 and the PCIE Endpoint 220 may be a rack server, and the PCIE switch device 210 may be a PCIE switch.

In the embodiment of the present disclosure, an active PCIE switch device and a standby PCIE switch device are disposed, and interconnected communication interfaces are disposed on the two PCIE switch devices, so that switch network configuration information of the active PCIE switch device may be transferred to the standby PCIE switch device through the communication interfaces. When a fault occurs in the active PCIE switch device, the standby PCIE switch device may adopt switch network configuration information same as that of the active PCIE switch device to perform configuration, thereby improving reliability of a system.

At the same time, the host adopts the port configuration information of the third PCIE port connected to the active PCIE switch device before the switching to configure the third PCIE port connected to the active PCIE switch device after the switching, so the host does not need to be reset and restarted to scan the entire system.

In addition, the second PCIE port connected to the processing module of the PCIE endpoint is all the time only located in the PCIE switch partition where the second PCIE port currently connected to the active PCIE switch device is located, namely, the active PCIE switch partition, so when scanning, the host only sees one PCIE endpoint all the time, which avoids that a same PCIE endpoint is scanned twice, and configuration of the two second PCIE ports connected to the PCIE switch devices is completely the same, so the switching may be completed in a very short time. That is to say, when one PCIE switch device fails, it may be directly switched to the other PCIE switch device. System configuration before and after the switching is completely the same, so working of the system is not affected at all, which greatly improves reliability of the system.

In addition, in the embodiment of the present disclosure, the fault detection module is adopted to perform fault detection, and the active-standby interlocking module is adopted to execute automatic switching, thereby further improving the reliability of the system.

Embodiment 3

Figure 3:
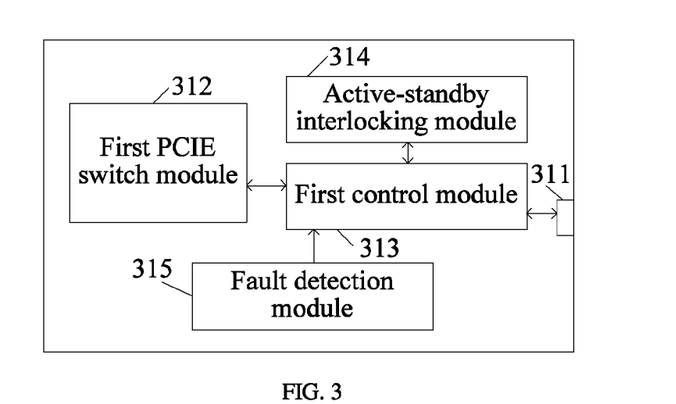
FIG. 3 is a schematic structural diagram of a PCIE switch device according to Embodiment 3 of the present disclosure.

An embodiment of the present disclosure provides a PCIE switch device, which is applicable to the PCIE switch-based server system provided by Embodiment 1 or 2. As shown in FIG. 3, the PCIE switch device includes a first PCIE switch module 312 and a communication interface 311 configured to connect to another PCIE switch device, and the first PCIE switch module 312 includes at least two first PCIE ports. The first PCIE ports are configured to connect to a HOST and a PCIE Endpoint. One of the PCIE switch device and the another PCIE switch device is an active PCIE switch device, and the other is a standby PCIE switch device.

When the PCIE switch device is used as the active PCIE switch device, and the another PCIE switch device is used as the standby PCIE switch device, the PCIE switch device transfers switch network configuration information of the active PCIE switch device to the another PCIE switch device through the communication interface; and when the PCIE switch device is used as the standby PCIE switch device, and the another PCIE switch device is used as the active PCIE switch device, the PCIE switch device obtains switch network configuration information of the active PCIE switch device through the communication interface.

Preferably, the PCIE switch device further includes a first control module 313, where the first control module 313 is connected to the first PCIE switch module 312 and the communication interface 311. The first control module 313 includes a first CPU, where the first CPU is configured to interact with a first central processing unit of the another PCIE switch device through the communication interface 311, so that the standby PCIE switch device obtains the switch network configuration information of the active PCIE switch device.

Preferably, it is assumed that switching of the active and standby PCIE switch devices occurs in a process in which the PCIE Endpoint communicates with the active PCIE switch device, the switch network configuration information may further include information related to the PCIE Endpoint. For example, information such as an ID and an address of the PCIE Endpoint may be included. One second PCIE port of the PCIE Endpoint is connected to a first PCIE port of the PCIE switch device, and the other second PCIE port is connected to a first PCIE port of the another PCIE switch device.

Furthermore, the PCIE switch device further includes: an active-standby interlocking module 314, where the active-standby interlocking module 314 is connected to the first control module 313, the HOST and the PCIE Endpoint. When the PCIE switch device is the active PCIE switch device, the active-standby interlocking module 314 is configured to execute active-standby switching according to a control instruction of the first control module 313, and send an active-standby state of the PCIE switch device after the switching to the first control module 313, the HOST and the PCIE Endpoint. When the PCIE switch device is the standby PCIE switch device, the active-standby interlocking module 314 is configured to obtain an active-standby state of the active PCIE switch device by interacting with an active-standby interlocking module of the active PCIE switch device, execute active-standby switching according to the obtained active-standby state of the active PCIE switch device, and send the active-standby state of the PCIE switch device after the switching to the first control module 313 of the PCIE switch device, the HOST and the PCIE Endpoint. The active-standby interlocking module 314 may be implemented by adopting a hardware circuit.

Preferably, the PCIE switch device further includes: a fault detection module 315, where the fault detection module 315 is connected to the first control module 313 and configured to detect whether a fault exists in a PCIE link connected to one first PCIE port, and whether the PCIE switch device fails. Whether the PCIE switch device fails may be judged according to key register information. When the fault detection module 315 of the active PCIE switch device has detected that the PCIE link connected to the first PCIE port of the active PCIE switch device or the active PCIE switch device fails, the first control module 313 sends a control instruction, and the control instruction is used to instruct active-standby interlocking modules 314 of the active PCIE switch device and the standby PCIE switch device to execute the active-standby switching of the two PCIE switch devices.

In the embodiment of the present disclosure, an active PCIE switch device and a standby PCIE switch device are disposed, and interconnected communication interfaces are disposed on the two PCIE switch devices, so that switch network configuration information of the active PCIE switch device may be transferred to the standby PCIE switch device through the communication interfaces. When a fault occurs in the active PCIE switch device, the standby PCIE switch device may adopt switch network configuration information same as that of the active PCIE switch device to perform configuration, thereby improving reliability of a system. In addition, in the embodiment of the present disclosure, the fault detection module is adopted to perform fault detection, and the active-standby interlocking module is adopted to execute automatic switching, thereby further improving the reliability of the system.

Embodiment 4

Figure 4:
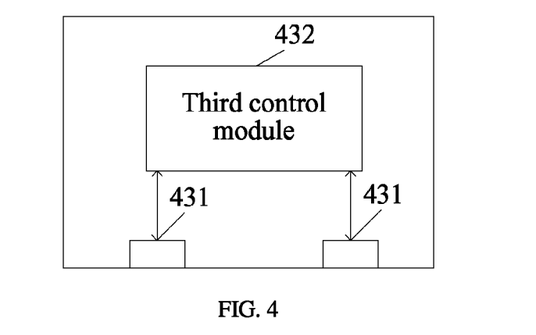
FIG. 4 is a schematic structural diagram of a PCIE Endpoint according to Embodiment 4 of the present disclosure.

An embodiment of the present disclosure provides a host, which is applicable to the PCIE switch-based server system provided by Embodiment 2. As shown in FIG. 4, the HOST includes two third PCIE ports 431, where one third PCIE port 431 is configured to connect to a first PCIE port of an active PCIE switch device, and the other third PCIE port 431 is configured to connect to a first PCIE port of a standby PCIE switch device.

Furthermore, the HOST further includes a third control module 432, where the third control module 432 includes: a third CPU, configured to, after active-standby switching of the active PCIE switch device and the standby PCIE switch device, open the third PCIE port connected to the active PCIE switch device after the switching, and adopt port configuration information of the third PCIE port connected to the active PCIE switch device before the switching to configure the third PCIE port connected to the active PCIE switch device after the switching, and at the same time, disable the third PCIE port connected to the standby PCIE switch device after the switching.

The third CPU is further configured to configure an entire PCIE system when the system is initialized, which includes configuring the third PCIE port of the HOST itself, the PCIE switch device and a PCIE Endpoint.

In the embodiment of the present disclosure, the host adopts the port configuration information of the third PCIE port connected to the active PCIE switch device before the switching to configure the third PCIE port connected to the active PCIE switch device after the switching, so the host does not need to be reset and restarted to scan the entire system.

Embodiment 5

Figure 5:
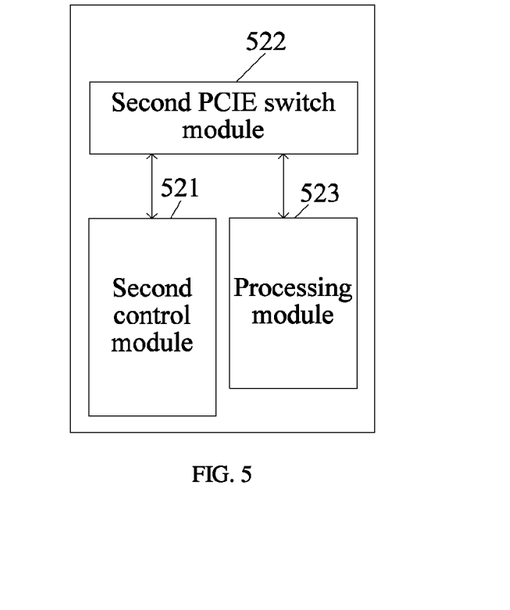
FIG. 5 is a schematic structural diagram of a HOST according to Embodiment 5 of the present disclosure.

An embodiment of the present disclosure provides a PCIE Endpoint, which is applicable to the PCIE switch-based server system provided by Embodiment 1 or 2. As shown in FIG. 5, the PCIE Endpoint includes a second PCIE switch module 522, where the second PCIE switch module 522 includes two second PCIE ports, one second PCIE port is configured to connect to a first PCIE port of an active PCIE switch device, and the other second PCIE port is configured to connect to a first PCIE port of a standby PCIE switch device.

Furthermore, the PCIE Endpoint further includes a second control module 521 and a processing module 523, where the second PCIE switch module 522 is connected to the second control module 521 and the processing module 523, and the processing module 523 is connected to the second PCIE switch module 522 through one second PCIE port.

The second control module 521 includes: a second CPU, configured to, before active-standby switching of the active PCIE switch device and the standby PCIE switch device, synchronize port configuration information of the second PCIE port connected to the active PCIE switch device to the second PCIE port connected to the standby PCIE switch device, and after the active-standby switching of the active PCIE switch device and the standby PCIE switch device, add the second PCIE port connected to the processing module 523 to a PCIE switch partition where the second PCIE port connected to the active PCIE switch device after the switching is located, where the second PCIE ports connected to the active PCIE switch device and the standby PCIE switch device are uplink ports, the second PCIE port connected to the processing module 523 is a downlink port, and the two uplink ports are located in different PCIE switch partitions, that is to say, one PCIE switch partition only has one uplink port. The processing module 523 includes, but is not limited to, a GPU, an SSD, a DSP, and an encryption/decryption unit.

The second CPU is further configured to create two PCIE switch partitions when a system is initialized, and each PCIE switch partition has only one uplink port, namely, the second PCIE port connected to the PCIE switch device. A partition where one second PCIE port connected to the active PCIE switch device is located may be referred to as an active PCIE switch partition; and a partition where the other second PCIE port connected to the standby PCIE switch device is located may be referred to as a standby PCIE switch partition. In this case, the downlink port connected to the processing module 523 is added to the active PCIE switch partition.

After the active-standby switching of the active PCIE switch device and the standby PCIE switch device, in this case, the standby PCIE switch device is used as the active PCIE switch device after the switching, and the active PCIE switch device is used as the standby PCIE switch device after the switching. A partition where the second PCIE port connected to the active PCIE switch device after the switching is located is referred to as an active PCIE switch partition after the switching, and a partition where the second PCIE port connected to the standby PCIE switch device after the switching is located is referred to as a standby PCIE switch partition after the switching. In this case, the downlink port connected to the processing module 523 is added to the active PCIE switch partition after the switching.

In the embodiment of the present disclosure, the second PCIE port connected to the processing module of the PCIE endpoint is all the time only located in the PCIE switch partition where the second PCIE port currently connected to the active PCIE switch device is located, so when scanning, the host only sees one PCIE endpoint all the time, which avoids that a same PCIE endpoint is scanned twice, and configuration of the two second PCIE ports connected to the PCIE switch devices is completely the same, so the switching may be completed in a very short time.

Embodiment 6

An embodiment of the present disclosure provides a PCIE switch-based switching method, which is applicable to the PCIE switch-based server system provided by Embodiment 1 or 2, and the method includes:

transferring, by an active PCIE switch device, switch network configuration information of the active PCIE switch device to a standby PCIE switch device through a communication interface of the active PCIE switch device, so that the standby PCIE switch device adopts the switch network configuration information to configure the standby PCIE switch device.

Preferably, a communication interface of the standby PCIE switch device may be a fast Ethernet interface or a gigabit Ethernet interface. The communication interface of the active PCIE switch device may also be a fast Ethernet interface or a gigabit Ethernet interface.

Preferably, it is assumed that switching of the active and standby PCIE switch devices occurs in a process in which a PCIE Endpoint communicates with the active PCIE switch device, the switch network configuration information may further include information related to the PCIE Endpoint. For example, information such as an ID and an address of the PCIE Endpoint may be included. One second PCIE port of the PCIE Endpoint is connected to a first PCIE port of the active PCIE switch device, and the other second PCIE port is connected to a first PCIE port of the standby PCIE switch device.

Figure 6:
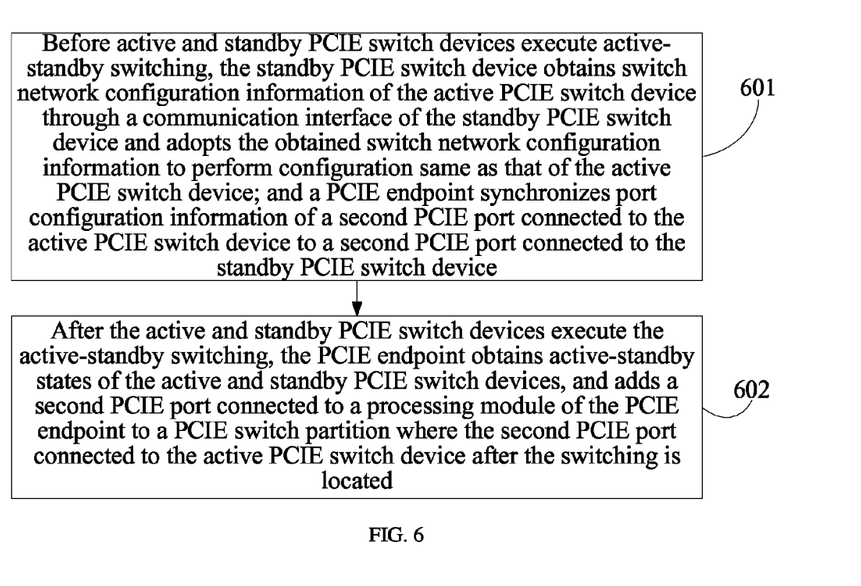
FIG. 6 is a schematic flow chart of a PCIE switch-based switching method according to Embodiment 6 of the present disclosure.

Detailed description is given in the following with reference to FIG. 6.

Step 601: Before active and standby PCIE switch devices execute active-standby switching, the standby PCIE switch device obtains switch network configuration information of the active PCIE switch device through a communication interface of the standby PCIE switch device and adopts the obtained switch network configuration information to configure the standby PCIE switch device. For example, configuration same as that of the active PCIE switch device may be performed; and a PCIE endpoint synchronizes port configuration information of a second PCIE port connected to the active PCIE switch device to a second PCIE port connected to the standby PCIE switch device.

Step 602: After the active and standby PCIE switch devices execute the active-standby switching, the PCIE endpoint obtains active-standby states of the active and standby PCIE switch devices, and adds a second PCIE port connected to a processing module of the PCIE Endpoint to a PCIE switch partition where the second PCIE port connected to the active PCIE switch device after the switching is located, where the second PCIE port connected to the active PCIE switch device and the second PCIE port connected to the standby PCIE switch device are located in different PCIE switch partitions.

The second PCIE ports connected to the active PCIE switch device and the standby PCIE switch device are uplink ports, and the second PCIE port connected to the processing module is a downlink port, where the two uplink ports are located in different PCIE switch partitions, and one PCIE switch partition only has one uplink port.

Preferably, the method further includes: opening, by a host, a third PCIE port connected to the active PCIE switch device after the switching after the active-standby switching of the active PCIE switch device and the standby PCIE switch device, adopting port configuration information of a third PCIE port connected to the active PCIE switch device before the switching to configure the third PCIE port connected to the active PCIE switch device after the switching, and at the same time, disabling the third PCIE port connected to the standby PCIE switch device after the switching, where the host includes two third PCIE ports, one third PCIE port is connected to a first PCIE port of the active PCIE switch device and the other third PCIE port is connected to a first PCIE port of the standby PCIE switch device.

Preferably, the method further includes: detecting, by a fault detection module of the active PCIE switch device, whether a fault exists in a PCIE link connected to the active PCIE switch device, and whether a fault exists in the active PCIE switch device; and if a fault exists in the PCIE link connected to the active PCIE switch device or a fault exists in the active PCIE switch device, executing the active-standby switching on the active PCIE switch device and the standby PCIE switch device.

Preferably, the method further includes: executing, by an active-standby interlocking module of the active PCIE switch device, active-standby switching according to a control instruction of a first control module of the active PCIE switch device, and sending the active-standby state of the PCIE switch device after the switching to the first control module of the device, the host or the PCIE endpoint, and an active-standby interlocking module of the standby PCIE switch device.

Preferably, the method further includes: obtaining, by the active-standby interlocking module of the standby PCIE switch device, an active-standby state of the active PCIE switch device by interacting with the active-standby interlocking module of the active PCIE switch device, executing the active-standby switching of the standby PCIE switch device according to the obtained active-standby state of the active PCIE switch device, and sending the active-standby state of the PCIE switch device after the switching to the first control module of the standby PCIE switch device, the host and the PCIE endpoint.

In the embodiment of the present disclosure, an active PCIE switch device and a standby PCIE switch device are disposed, and interconnected communication interfaces are disposed on the two PCIE switch devices, so that switch network configuration information of the active PCIE switch device may be transferred to the standby PCIE switch device through the communication interfaces. When a fault occurs in the active PCIE switch device, the standby PCIE switch device may adopt switch network configuration information same as that of the active PCIE switch device to perform configuration, thereby improving reliability of a system.

Embodiment 7

Figure 7:
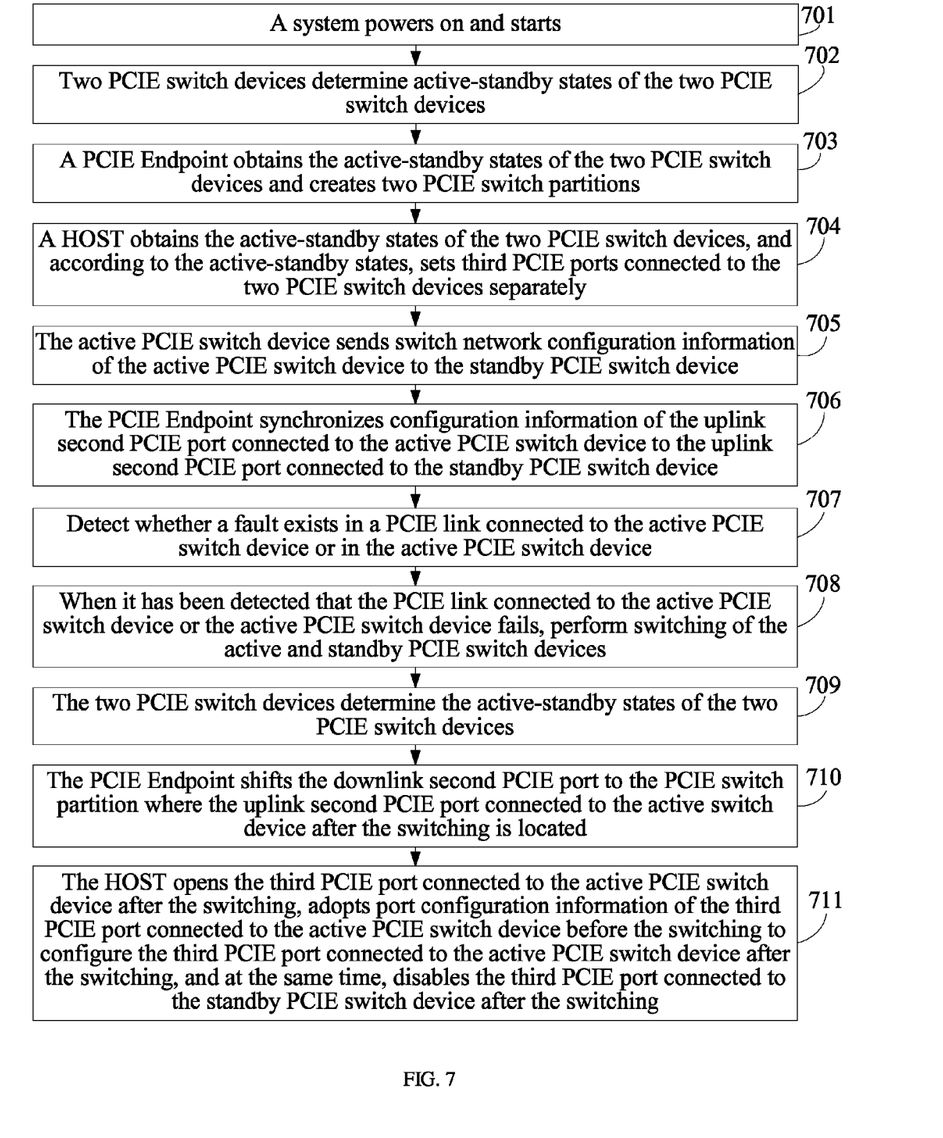
FIG. 7 is a schematic flow chart of a PCIE switch-based switching method according to Embodiment 7 of the present disclosure.

An embodiment of the present disclosure provides a PCIE switch-based switching method, which is applicable to the PCIE switch-based server system provided by Embodiment 1 or 2. Referring to FIG. 7, the method includes:

Step 701: A system powers on and starts.

After the system powers on and starts, two PCIE switch devices begin to be initialized.

For example, initialization of a PCIE switch device includes:

a first control module of the PCIE switch device initializes a first PCIE switch module of the PCIE switch device according to preset system configuration, such as configures uplink/downlink ports and partitions of a PCIE switch network, which is the prior art, and is not described in detail here.

Step 702: Two PCIE switch devices determine active-standby states of the two PCIE switch devices, where one is used as an active PCIE switch device, and the other is used as a standby PCIE switch device.

Furthermore, the active-standby states of the two PCIE switch devices may be determined according to a starting sequence and device states (for example, key chip self-checking) of the PCIE switch devices, and so on.

In specific implementation, it may be implemented through active-standby interlocking modules of the two PCIE switch devices.

Step 703: A PCIE Endpoint obtains the active-standby states of the two PCIE switch devices and creates two PCIE switch partitions, where one PCIE switch partition includes one uplink port (a second PCIE port connected to the PCIE switch device is an uplink port), and adds one or more downlink ports (a second PCIE port connected to a processing module of the PCIE Endpoint is a downlink port) to a PCIE switch partition where an uplink port connected to the active PCIE switch device is located. The PCIE Endpoint includes a second PCIE switch module, and the second PCIE switch module includes two second PCIE ports, where one second PCIE port is configured to connect to a first PCIE port of the active PCIE switch device, and the other second PCIE port is configured to connect to a first PCIE port of the standby PCIE switch device.

For example, the processing module of the PCIE Endpoint includes, but is not limited to, a GPU, an SSD, a DSP, and an encryption/decryption unit.

In this embodiment, the second PCIE interface set as the uplink port is referred to as an uplink second PCIE port, and the second PCIE interface set as the downlink port is referred to as a downlink second PCIE port.

Before active-standby switching of the active PCIE switch device and the standby PCIE switch device, a partition where a second PCIE port connected the active PCIE switch device is located may be referred to as an active PCIE switch partition; and a partition where a second PCIE port connected to the standby PCIE switch device is located is referred to as a standby PCIE switch partition. In this case, the downlink second PCIE port connected to the processing module is added to the active PCIE switch partition.

For example, the PCIE Endpoint obtains the active-standby states of the two PCIE switch devices through the active-standby interlocking modules.

Step 704: A HOST obtains the active-standby states of the two PCIE switch devices, and according to the active-standby states, sets third PCIE ports connected to the two PCIE switch devices separately. The HOST includes two third PCIE ports, where one third PCIE port is configured to connect to one first PCIE port of the active PCIE switch device, and the other third PCIE port is configured to connect to the other first PCIE port of the standby PCIE switch device.

Similarly, the HOST may obtain the active-standby states of the two PCIE switch devices through the active-standby interlocking modules.

For example, the step includes: opening the third PCIE port connected to the active PCIE switch device, and at the same time, disabling the third PCIE port connected to the standby PCIE switch device. Then, the HOST configures the entire system, which includes configuring the third PCIE port of the HOST itself, the PCIE switch device and the PCIE Endpoint.

For example, the HOST stores port configuration information of the third PCIE port connected to the active PCIE switch device in a memory.

After executing of step 704 is completed, the system begins to run normally.

Step 705: The active PCIE switch device sends switch network configuration information of the active PCIE switch device to the standby PCIE switch device, and the standby PCIE switch device adopts the obtained switch network configuration information to perform configuration same as that of the active PCIE switch device.

For example, the switch network configuration information may be sent through a communication link between the two PCIE switch devices.

Preferably, the switch network configuration information may be sent at regular time.

Step 706: The PCIE Endpoint synchronizes configuration information of the uplink second PCIE port connected to the active PCIE switch device to the uplink second PCIE port connected to the standby PCIE switch device.

For example, the synchronization here refers to regularly adopting the configuration information of the uplink second PCIE port connected to the active PCIE switch device to configure the uplink second PCIE port of the standby PCIE switch device, so as to ensure that when the active-standby switching is executed, configuration information of the uplink second PCIE port connected to the standby PCIE switch device is the same as that of the uplink second PCIE port connected to the active PCIE switch device.

Step 707: Detect whether a fault exists in a PCIE link connected to the active PCIE switch device or in the active PCIE switch device. For example, whether a fault exists in a PCIE link between the active PCIE switch device and the host, whether a fault exists in a PCIE link between the active PCIE switch device and the PCIE endpoint, and whether a fault exists in the active PCIE switch device are detected.

For example, whether the PCIE switch device fails may be judged according to key register information.

It should be noted that, in a case that the system runs normally, executing of step 705, step 706 and step 707 has no sequence. They may be executed at the same time, and may also be executed sequentially according to a preset sequence. In a process in which the system runs normally, step 705, step 706 and step 707 are executed several times.

Step 708: When it has been detected that the PCIE link connected to the active PCIE switch device or the active PCIE switch device fails, perform switching of the active and standby PCIE switch devices.

That is, the active PCIE switch device before the switching becomes the standby PCIE switch device after the switching, and the standby PCIE switch device before the switching becomes the active PCIE switch device after the switching.

For example, the step may be implemented by controlling an active-standby interlocking module by the first control module of the PCIE switch device.

Step 709: The two PCIE switch devices determine the active-standby states of the two PCIE switch devices.

For example, the step is also implemented through the active-standby interlocking modules.

Step 710: The PCIE Endpoint shifts the downlink second PCIE port to the PCIE switch partition where the uplink second PCIE port connected to the active switch device after the switching is located.

For example, after the active-standby switching of the active PCIE switch device and the standby PCIE switch device, a partition where the second PCIE port connected to the active PCIE switch device after the switching is located is referred to as an active PCIE switch partition after the switching, and a partition where the second PCIE port connected to the standby PCIE switch device after the switching is located is referred to as a standby PCIE switch partition after the switching. In this case, the downlink second PCIE port connected to the processing module is added to the active PCIE switch partition after the switching.

Step 711: The HOST opens the third PCIE port connected to the active PCIE switch device after the switching, adopts port configuration information of the third PCIE port connected to the active PCIE switch device before the switching to configure the third PCIE port connected to the active PCIE switch device after the switching, and at the same time, disables the third PCIE port connected to the standby PCIE switch device after the switching.

For example, the port configuration information which is of the third PCIE port connected to the active PCIE switch device before the switching and stored in the memory in step 704 may be used to configure the third PCIE port connected to the active PCIE switch device after the switching.

Executing of the foregoing steps 710 and 711 has no sequence, which may be executed at the same time, and may also be executed sequentially according to a preset sequence.

In the embodiment of the present disclosure, an active PCIE switch device and a standby PCIE switch device are disposed, and interconnected communication interfaces are disposed on the two PCIE switch devices, so that switch network configuration information of the active PCIE switch device may be transferred to the standby PCIE switch device through the communication interfaces. When a fault occurs in the active PCIE switch device, the standby PCIE switch device may adopt switch network configuration information same as that of the active PCIE switch device to perform configuration, thereby improving reliability of a system.

At the same time, the host adopts the port configuration information of the third PCIE port connected to the active PCIE switch device before the switching to configure the third PCIE port connected to the active PCIE switch device after the switching, so the host does not need to be reset and restarted to scan the entire system.

In addition, the second PCIE port connected to the processing module of the PCIE endpoint is all the time only located in the PCIE switch partition where the second PCIE port currently connected to the active PCIE switch device is located, namely, the active PCIE switch partition, so when scanning, the host only sees one PCIE endpoint all the time, which avoids that a same PCIE endpoint is scanned twice, and configuration of the two second PCIE ports connected to the PCIE switch devices is completely the same, so the switching may be completed in a very short time. That is to say, when one PCIE switch device fails, it may be directly switched to the other PCIE switch device. System configuration before and after the switching is completely the same, so working of the system is not affected at all, which greatly improves reliability of the system.

It should be noted that: when the server system provided by the foregoing embodiment executes the active-standby switching of the PCIE switch device, only dividing of the foregoing functional modules is described by taking examples. In an actual application, the foregoing functions may be allocated to different functional modules for completion as required. That is, an internal structure of an apparatus is divided into different functional modules, so as to complete all or part of the functions described in the foregoing. In addition, the server system provided by the foregoing embodiment and the switching method embodiment belong to same conception, and for the specific implementation process, reference may be made to the method embodiments, and details are not repeatedly described here.

The sequence numbers of the foregoing embodiments of the present disclosure are merely for description purpose but do not indicate the preference of the embodiments.

Persons of ordinary skill in the art may understand that all or part of the steps of the foregoing embodiments may be implemented through hardware, and may also be implemented by a program instructing relevant hardware. The program may be stored in a computer readable storage medium. The storage medium may be a read-only memory, a magnetic disk, or an optical disk, or the like.

The foregoing description is merely exemplary embodiments of the present disclosure, but is not intended to limit the present disclosure. Any modification, equivalent replacement, or improvement made within the spirit and principle of the present disclosure shall fall within the protection scope of the present disclosure.

What is claimed is:

1. A method in a peripheral component interconnect express (PCIE) system having a host, a PCIE endpoint, a first PCIE switch device, and a second PCIE switch device, the method comprises:
   obtaining, by the second PCIE switch device, switch network configuration information of the first PCIE switch device, wherein both the first PCIE switch device and the second PCIE switch device are connected to the host and the PCIE endpoint, and wherein the first PCIE switch device is configured according to the switch network configuration information to transmit communications between the host and the PCIE endpoint;
   detecting, by the second PCIE switch device, that a fault has occurred in the first PCIE switch device;
   upon detecting the fault, configuring, by the second PCIE switch device, itself according to the switch network configuration information to transmit communications between the host and the PCIE endpoint;
   upon detecting the fault, configuring, by the host without being restarted, a PCIE port of the host connected to the second PCIE switch device according to port configuration information of another PCIE port of the host connected to the first PCIE switch device to communicate with the PCIE endpoint through the second PCIE switch device;
   upon detecting the fault, configuring, by the PCIE endpoint, a PCIE port of the PCIE endpoint connected to the second PCIE switch device according to port configuration information of another PCIE port connected to the first PCIE switch device to communicate with the host through the second PCIE switch device; and
   adding, by the PCIE endpoint, a downlink port of the PCIE endpoint to a PCIE switch partition where the PCIE port of the PCIE endpoint connected to the second PCIE switch device is located.

2. The method according to claim 1, wherein the step of detecting comprises:
   detecting, by the second PCIE switch device, an active-standby state of the first PCIE switch device in response to active-standby switching of the first PCIE switch device, wherein the first PCIE switch device is configured to detect that the fault has occurred in the first PCIE switch device and then execute the active-standby switching of the first PCIE switch device.

3. The method according to claim 2, further comprises:
   executing, by the second PCIE switch device, active-standby switching of the second PCIE switch device according to the active-standby state of the first PCIE switch device.

4. The method according to claim 1, further comprising:
   opening, by the host, the PCIE port of the host connected to the second PCIE switch device;
   disabling, by the host, the other PCIE port of the host connected to the first PCIE switch device.

5. A peripheral component interconnect express (PCIE) system having a host, a PCIE endpoint, a first PCIE switch device, and a second PCIE switch device, wherein:
   both the first PCIE switch device and the second PCIE switch device are connected to the host and the PCIE endpoint;

the first PCIE switch device is configured according to switch network configuration information to transmit communications between the host and the PCIE endpoint;

the second PCIE switch device is configured to obtain the switch network configuration information of the first PCIE switch device, and detect that a fault has occurred in the first PCIE switch device;

the second PCIE switch device, upon detecting the fault, is further configured to configure itself according to the switch network configuration information to transmit communications between the host and the PCIE endpoint;

the host without being restarted, upon detecting the fault, is configured to configure a PCIE port of the host connected to the second PCIE switch device according to port configuration information of another PCIE port of the host connected to the first PCIE switch device to communicate with the PCIE endpoint through the second PCIE switch device;

the PCIE endpoint, upon detecting the fault, is configured to configure a PCIE port of the PCIE endpoint connected to the second PCIE switch device according to port configuration information of another PCIE port connected to the first PCIE switch device to communicate with the host through the second PCIE switch device; and the PCIE endpoint is further configured to add a downlink port of the PCIE endpoint to a PCIE switch partition where the PCIE port of the PCIE endpoint connected to the second PCIE switch device is located.

6. The system according to claim 5, wherein the second PCIE switch device is configured to detect comprises:

the second PCIE switch device is configured to detect an active-standby state of the first PCIE switch device in response to active-standby switching of the first PCIE switch device, wherein the first PCIE switch device is configured to detect that the fault has occurred in the first PCIE switch device and then execute the active-standby switching of the first PCIE switch device.

7. The system according to claim 5, wherein the second PCIE switch device is further configured to execute active-standby switching of the second PCIE switch device according to the active-standby state of the first PCIE switch device.

8. The system according to claim 5, wherein the host is further configured to open the PCIE port of the host connected to the second PCIE switch device, and disable the other PCIE port of the host connected to the first PCIE switch device.

* * * * *